Figure 1:
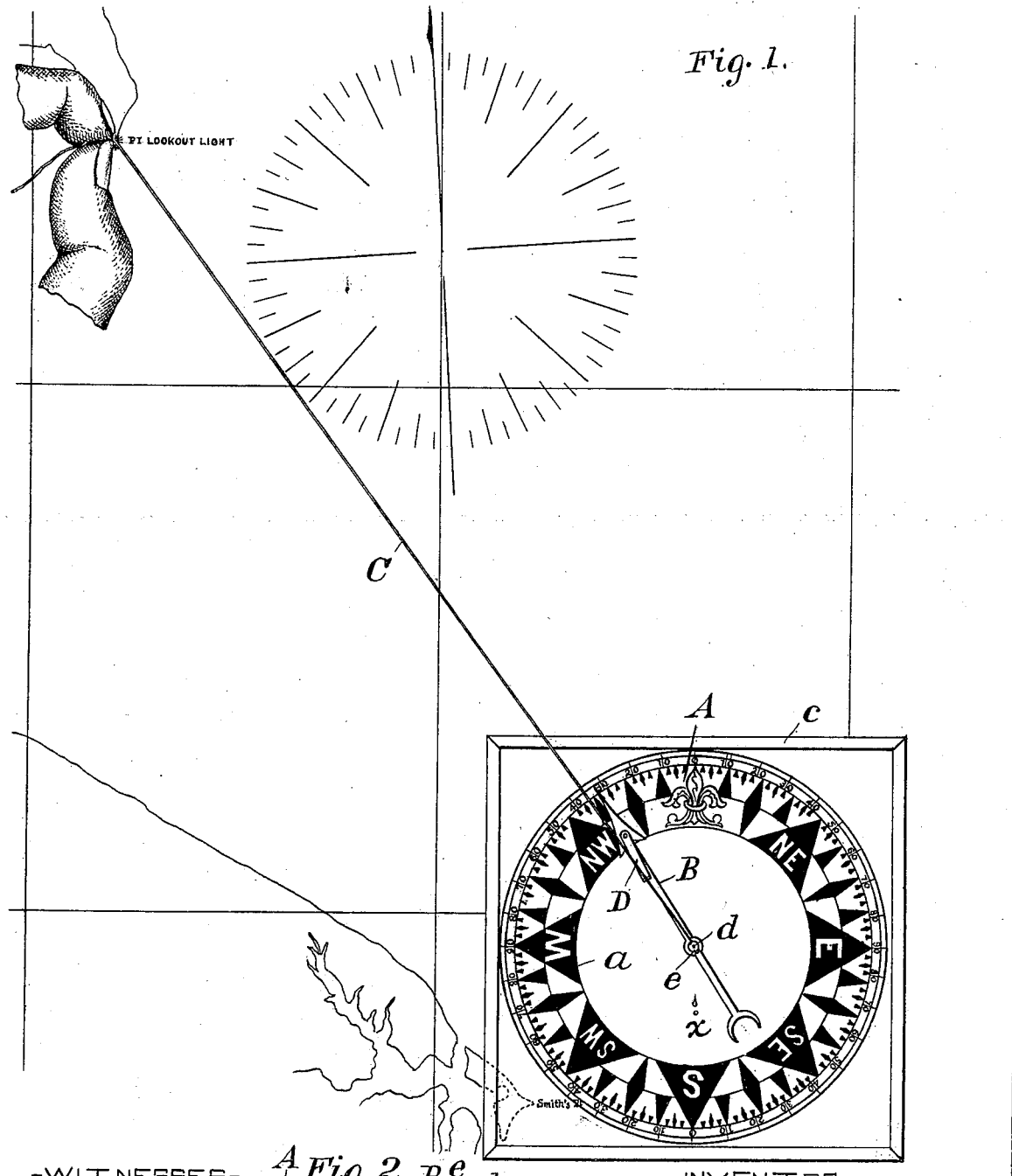

No. 645,653. Patented Mar. 20, 1900.
C. H. WHITE.
COURSE FINDING INSTRUMENT FOR NAVIGATORS.
(Application filed Dec. 4, 1897. Renewed July 29, 1899.)

(No Model.)

WITNESSES
Dan'l Fisher
H. Constantine

INVENTOR
Charles H. White,
by Geo. W. J. Howard,
atty.

UNITED STATES PATENT OFFICE.

CHARLES H. WHITE, OF BALTIMORE, MARYLAND, ASSIGNOR OF ONE-HALF TO CHARLES M. STRUVEN, OF SAME PLACE.

COURSE-FINDING INSTRUMENT FOR NAVIGATORS.

SPECIFICATION forming part of Letters Patent No. 645,653, dated March 20, 1900.

Application filed December 4, 1897. Renewed July 29, 1899. Serial No. 725,546. (No model.)

*To all whom it may concern:*

Be it known that I, CHARLES H. WHITE, of the city of Baltimore, in the State of Maryland, have invented certain Improvements in Course-Finding Instruments for Navigators, of which the following is a specification.

This invention relates to a device adapted for temporary application to a map or chart whereby a navigator may easily and readily ascertain the direction to be sailed according to his mariner's compass to make a certain point or position.

The said invention consists in a card on which is printed the points and fractions of points of the compass, with the central portion thereof open or made of some transparent material and provided with a revoluble pointer. To the pin in the center of the card to which the pointer is pivoted is loosely attached a fine cord, which is passed through an eye in an arm hinged to the head of the pointer, so that when the cord is drawn tight and moved around the card the hand will be moved with it.

To fully understand the nature and object of the invention, it must be understood that all charts used by navigators have printed on them, in various places, diagrams of the points of the mariner's compass and a pointer showing in degrees of a circle and in fractions of the points of the compass the variation of the magnetic needle from the true north at such positions on the chart.

Ordinarily when a navigator has ascertained by observation or otherwise his position on the chart and desires to give to the wheelsman the course to be sailed until another observation is made he draws an imaginary line between his present position and the next objective point. He then by the aid of the parallel-ruler transfers that line to the center of the nearest diagram of the points of the compass, or, in other words, draws a second imaginary line parallel with the first through the center of the said diagram and intersecting the circle, which is divided into degrees or the points and fractions of the points of the compass. This gives him the course to be sailed, except that the direction has to be corrected by the variation of the magnetic needle from the true north, as indicated by the pointer on the said diagram, and the deviation of the needle from the magnetic north owing to local attraction. For instance, if the variation of the needle is, say, one point to the west the compass-course to be steered is one point to the east of the course indicated by the parallel-ruler.

In the further description of the said invention which follows reference is made to the accompanying drawings, forming a part hereof, and in which—

Figure 1 represents a part of the chart of the Chesapeake bay, showing Point Lookout and Smith's Point, which are at the entrance of the Potomac river, together with the card and its attachments which form the subject of the present invention. Fig. 2 is a cross-section of the card, showing its construction. Fig. 3 is an edge view of the pivoted arm before alluded to.

Referring now to the drawing, A represents a square piece of paper on which is printed the points and fractions of the points of the compass. The central portion of the paper, or that within the circle $a$, is cut out and the other part inclosed between two sheets of some transparent material, such as celluloid, and the whole bound together by a metallic frame $c$. In the center of the card, constructed as described, is secured a pin $d$, which projects above its upper surface, and over this pin is placed loosely the pointer B. Between the head $e$ of the pin $d$ and the upper surface of the pointer B is attached a fine cord C, which is passed through an eye $f$, formed in the upturned end of the arm D, hinged to the head of the pointer. The connection between the arm D and the pointer is of such a nature that some slight force is required to move the former independently of the latter, so that the arm will remain in any position with reference to the pointer in which it is placed.

In the foregoing description I have described the preferred construction of the card; but it is evident that various alterations may be made therein without materially affecting its efficiency.

The manner of using the invention is as follows: The arm D is first set so that the angular distance between the pointer and the cord when extended through the eye of the said arm and drawn taut will be equal to the reverse of the variation of the pointer from the true north, as indicated in the diagram on the chart nearest to the ascertained position of the vessel. Now supposing the vessel to be in a position adjacent to and directly north of a buoy $x$ off Smith's Point and it is desired to sail directly to Point Lookout light, which is indicated on the chart, the card is placed on the chart so that its center is directly over the present position of the vessel and its upper or lower edge parallel with an adjacent parallel of latitude described on the chart. The cord is then extended so as to intersect the Point Lookout light, when the pointer will give in points and fractions of a point the correct compass-course to be steered, provided the same is corrected for the deviation of the needle by local attraction.

I claim as my invention—

1. A device for the purpose described, which consists of a card with the points of the mariner's compass inscribed thereon, combined with a revoluble pointer pivoted at the center of the card, an adjustable arm projecting from the pointer, and a cord which is attached to the pivot of the pointer, and passes through the adjustable arm, whereby the angle of the pointer with reference to the cord when the same is stretched, may be changed to suit the variation of the magnetic needle from the true north, substantially as specified.

2. A device for the purpose described, which consists of a card with the points of the mariner's compass inscribed thereon, combined with a revoluble pointer pivoted at the center of the card, an eyed arm pivoted to the said pointer, and a cord which is attached to the pivot of the pointer and passes through the eye of the arm, whereby the angle of the pointer with reference to the cord when the same is stretched, may be changed to suit the variation of magnetic needle from the true north, substantially as specified.

CHARLES H. WHITE.

Witnesses:
 DANL. FISHER,
 WM. T. HOWARD.